United States Patent Office 3,131,409
Patented May 5, 1964

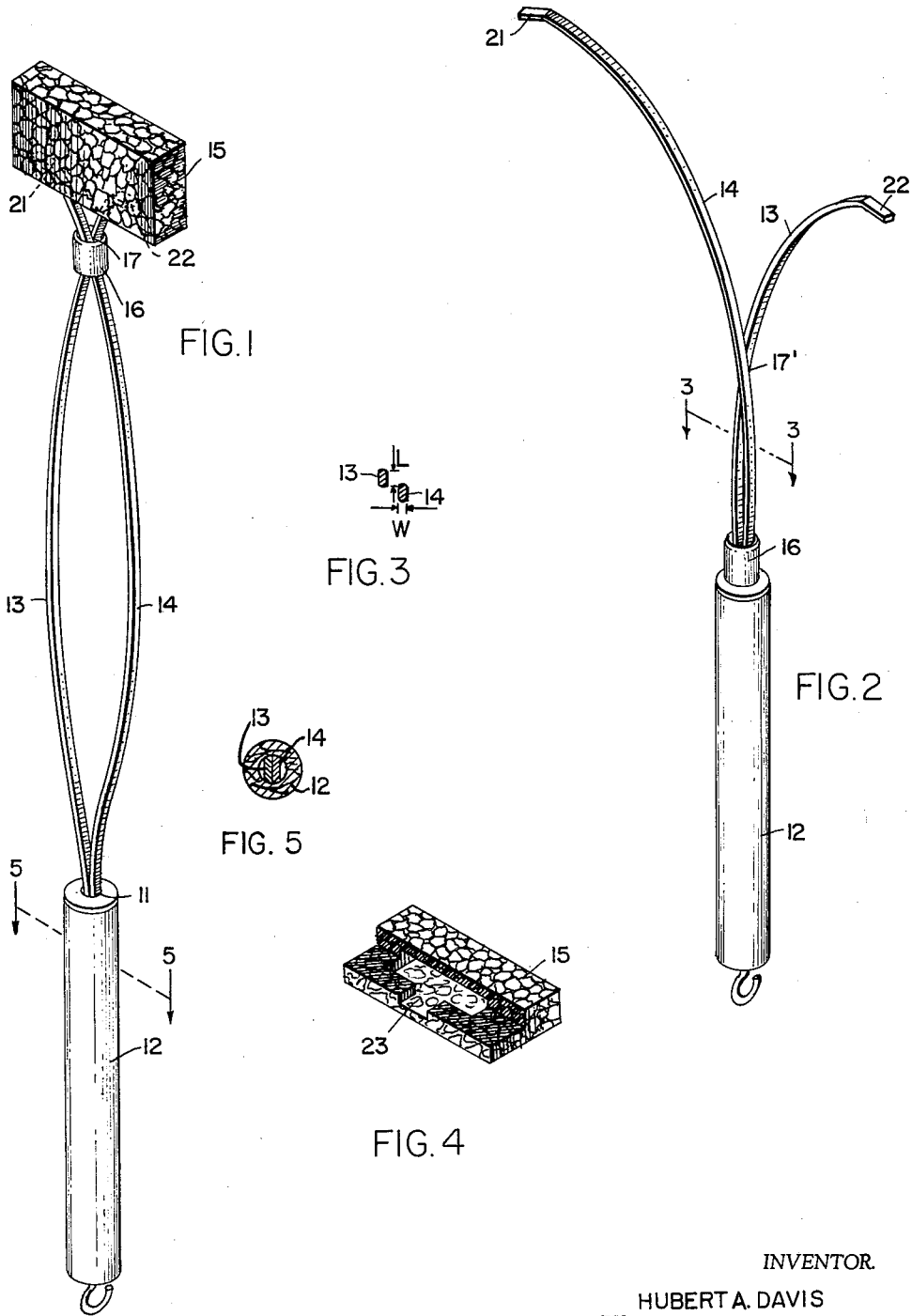

3,131,409
CLEANING DEVICE WITH PAD AND HANDLE
Hubert A. Davis, 6 Buckingham Road, Natick, Mass.
Filed June 25, 1962, Ser. No. 204,861
8 Claims. (Cl. 15—244)

The present invention relates in general to cleaning devices and more particularly concerns a cleaning device that is relatively easy to fabricate, low in cost, lightweight, easy to handle, capable of applying considerable cleaning forces to hard-to-clean areas and surfaces while using an inexpensive cleaning pad that is easy to change. The invention is especially useful for cleaning hot barbecue grills requiring the application of considerable pressure to a grill too hot to handle and even approach closely.

It is best to clean barbecue grills while they are still hot with a wet cleaning device because the heat turns the water into steam which seems to help the cleaning process. However, considerable pressure or "elbow grease" still ought to be applied to get the grill clean. But the heat from the coals is usually so great that it is difficult to approach the grill with a conventional brush and safely apply the desired pressure.

It is an important object of this invention to provide a cleaning device of relatively low cost, relatively easy to fabricate, relatively lightweight, easy to handle while transmitting considerable cleaning pressure to hard-to-reach areas to be cleaned, while using a cleaning pad that is relatively inexpensive and easy to change.

It is another object of the invention to achieve the preceding object with means capable of delivering wet pressure to a hot grill without danger of burning and while providing adequate thermal insulation between the hot grill and the user.

According to the invention, first and second rods, each more flexible in a first direction coextensive with a first rod dimension of its cross section than in a second direction coextensive with a second or length rod dimension of said cross section and generally perpendicular to said first dimension are provided, the length of each rod normally defining a curve. Means fasten an end portion of the length of the two rods together to form a structure having a cross section with a combined first or width dimension less than twice the said second or length rod dimension and a combined second dimension more than twice the said first or width rod dimension, the rods curving across each other at a point outside the end portion. That is, the width of the cross section of the held-together end portions is less than twice the length of the cross section of a single one of the rods while the length of the cross section of the held-together end portions is more than twice the width of the cross section of a single one of the rods. A further feature resides in collar means around and slidable along the rods along an intermediate portion of their length outside the said end portion for selectively positioning the cross over point of the rods. Still another feature of the invention resides in the end of each of the rods away from the fastened together end portions being formed with a tab. A pad formed with a pocket for accommodating these tabs may then be secured to the rods whereby movement of the collar means toward the means for fastening causes the tabs to press with greater force against the means defining the pocket and firmly secure the pad to the rods.

In an exemplary embodiment of the invention especially useful for cleaning barbecue grills, the fastening means is a wooden handle with a bore for accommodating two rods, typically steel, having a cross section of generally the shape of the numeral zero, the pad being a cellulose sponge. Preferably the cross section of the pocket in the sponge is generally T-shaped with the stem of the T accommodating the tabs when the collar is moved to a position far enough away from the wooden handle while allowing the tabs to penetrate into the cap of the T when the collar is moved toward the handle to firmly secure the pad to the rods.

Numerous other features, objects and advantages of the invention will become apparent from the following specification when read in connection with the accompanying drawing in which:

FIG. 1 is a perspective view of a representative embodiment of the invention;

FIG. 2 is a view of the embodiment of FIG. 1 with the pad removed and the collar immediately adjacent to the handle;

FIG. 3 is a sectional view through section 3—3 of FIG. 2 to illustrate the preferred cross section of the rods;

FIG. 4 is a view of the sponge with a portion cut away to illustrate a preferred form of the pocket for accommodating the tabs; and FIG. 5 is a sectional view through section 5—5 of FIG. 1 showing the held-together rod end portions in the handle.

With reference now to the drawing and more particularly FIG. 1 thereof, there is shown a perspective view of an exemplary embodiment according to the invention. A bore 11 in handle 12 snugly accommodates the lower end portions of left rod 13 and right rod 14 which carry cellulose sponge pad 15. The bore 11 snugly surrounds the lower ends of rods 13 and 14 and presses adjacent surfaces of these lower ends together along a line parallel to the common dimension L of the cross section of the rods as best seen in FIG. 5, a sectional view through section 5—5 of FIG. 1. A collar 16 slides along the intermediate portion of rods 13 and 14 to selectively position the crossover point 17. By moving the collar 16 away from the handle 12, the tabbed end 21 of right rod 14 moves toward the tabbed end 22 of left rod 13 so that pad 15 may be removed and cleaned or replaced by a new pad. By then placing the cleaned or new pad over tabs 21 and 22 and sliding collar 16 toward handle 12, the tabs 21 and 22 again help firmly secure pad 15 to rods 13 and 14.

Referring to FIG. 2, there is shown a view of this embodiment of the invention with the pad removed and collar 16 resting against the top of handle 12 to better illustrate certain structural features of the invention. Observe that in this position collar 16 has no control over the cross over point 17' of right rod 14 and left rod 13. Note that right rod 14 curves to the left of left rod 13 and left rod 13 curves to the right of right rod 14. This arrangement is advantageous because it provides a source of springlike pressure controllable by the collar 16 for securing the pad 15 to the rods. Still another advantage of the arrangement is believed to reside in having the relatively large area plane defined by the members 13 and 14 generally parallel to the surface to be cleaned to help keep the entire cleaning pad pressed firmly against the surface to be cleaned without pivoting about the axis coextensive with that of the handle.

Still another feature of the invention resides in having the rods 13 and 14 with the cross section shown in FIG. 3 of a shape corresponding generally to that of the numeral zero. The rods are thus relatively flexible in a direction along the narrow dimension W of the cross section while being relatively rigid in a direction along the long dimension L of the cross section. These characteristics are advantageous in permitting easy removal of the cleaning pad while transmitting considerable cleaning forces from the handle to the cleaning pad in a direction generally perpendicular to the plane enclosed between rods 13 and 14, a plane generally parallel to the large areas of the cleaning pad 15.

Referring to FIG. 4, there is shown a view of cleaning pad 15 with a portion cut away to expose the T-shaped pocket 23 for accommodating the ends 21 and 22 of rods 14 and 13, respectively.

In an exemplary embodiment of the invention especially useful for cleaning barbecue grills, the length of wooden handle 12 is 6¼", its diameter is $^{11}/_{16}$", 1⅝" of rods 13 and 14 are embedded in the bore 11 of handle 12, the bore being about $^{5}/_{16}$" in diameter, the distance from the top of handle 12 to sponge 15 is 11¼" and to collar 16 is 9½", sponge 15 is a cellulose sponge 1⅜" x 2½" x ⅝", rods 13 and 14 have a cross section with a length of ⅛" and a width of $^{1}/_{16}$" and is ordinary steel electrical snake wire. Collar 16 is a $^{9}/_{16}$" length of copper tubing having an inside diameter of $^{5}/_{16}$". The embodiment described with the illustrated dimension has been found adequate to clean a 24" barbecue grill while the coals are still hot. The metal rods 13 and 14 will not burn and the wooden handle 12 does not get hot.

While the embodiment described in detail is especially useful in connection with cleaning barbecue grills, exemplary embodiments have also been built which accommodate a much larger cellulose sponge and may be used for cleaning the tops of walls and other hard-to-reach places. It is also evident that different types of cleaning pads, such as steel wool and cloth or paper pads may be used wherein the tabs 21 and 22 are placed in ordinary pads having no T-shaped pocket, for example, within the principles of the invention. Dimensions different from the specific ones described herein may be employed according to the invention. For example, increasing the ratio of the spring steel rods 13 and 14 cross section from 2:1 as described above to 3:1 affords a remarkable increase in the pressure which can be applied to the pad through the handle and rods. It is evident that those skilled in the art may now make numerous modifications of and departures from the specific embodiments described herein without departing from the inventive concepts. Consequently, the invention is to be construed as limited only by the spirit and scope of the appended claims.

What is claimed is:
1. A cleaning device comprising,
first and second rods of substantially equally dimensioned cross section each much more flexible in a first direction coextensive with a first rod dimension of its cross section than in a second direction coextensive with a second rod dimension of said cross section that is generally perpendicular to said first dimension,
the length of each of said rods defining a curve,
means for fastening an end portion of the length of each of said rods together to form a structure defined by the held-together said end portions having a cross section with a width dimension less than twice said second rod dimension and a length dimension more than twice and less than three times said first rod dimension,
said rods always curving across each other at a crossover point outside said end portion,
collar means surrounding said crossover point and slidable along said rods along an intermediate portion of their length outside said end portion for selectively positioning said crossover point,
and a cleaning pad surrounding the end of each of said rods away from said end portion whereby movement of said collar means toward said means for fastening causes the latter ends to press with greater force against said pad and firmly secure said pad to said rods,
said collar means being located closer to said pad than to said means for fastening with said latter ends surrounded by and coupled to said pad.

2. Apparatus in accordance with claim 1 wherein said rods consist of noninflammable slightly yielding material.

3. Apparatus in accordance with claim 2 wherein said means for fastening includes a portion supporting said rods made of material having a thermal conductivity much less than that of said rods,
said portion functioning as a handle which can be gripped by a human while said rods are at a temperature higher than that which can be withstood by said human when contacting said rods.

4. Apparatus in accordance with claim 3 wherein said rod material is metal.

5. Apparatus in accordance with claim 4 wherein said fastening means portion is wood.

6. A manual cleaning device comprising,
first and second rods of substantially equally dimensioned cross section each much more flexible in a first direction coextensive with a first rod dimension of its cross section than in a second direction coextensive with a second rod dimension of said cross section generally perpendicular to said first dimension,
the length of each of said rods normally defining a curve,
means defining a handle,
collar means slidable along and surrounding both said rods and embracing the point where said rods cross over one another,
means carried by said handle for fastening one pair of ends of said rods together so that said rods curve across each other at a point adjacent to said handle when said collar means rests against said handle in the absence of a pad attached to the other pair of ends of said rods,
means defining a cleaning pad having generally parallel top and bottom surfaces separated by a distance much smaller than the maximum distance across said surfaces,
means between said top and bottom surfaces defining a pocket engaged by said other pair of ends and coacting therewith to keep said surfaces substantially perpendicular to said second dimension and substantially parallel to said first dimension,
said collar means being located closer to said cleaning pad defining means than to said handle defining means to maintain sufficient pressure against said pocket defining means from said other pair of ends to transmit a force applied to said handle defining means in both a direction generally perpendicular to and a direction parallel to said surfaces through said rods to that one of said surfaces in contact with a surface to be cleaned.

7. A manual cleaning device in accordance with claim 6 wherein said second dimension is substantially three times said first dimension.

8. A manual cleaning device in accordance with claim 6 wherein said means carried by said handle defining means comprises means defining a bore in said handle defining means snugly surrounding said one pair of ends and pressing adjacent surfaces of said pair of ends together along a line parallel to said second dimension.

References Cited in the file of this patent
UNITED STATES PATENTS

| | | |
|---|---|---|
| 185,138 | Schatzel et al. | Dec. 5, 1876 |
| 441,721 | Trumbore | Dec. 2, 1890 |
| 475,275 | Fuller | May 17, 1892 |
| 1,407,102 | Viden | Feb. 21, 1922 |
| 2,014,494 | Frumefreddo | Sept. 17, 1935 |
| 2,686,327 | King | Aug. 17, 1954 |